No. 867,192. PATENTED SEPT. 24, 1907.
J. W. DAWSON.
FLOATING POWER PLANT.
APPLICATION FILED SEPT. 13, 1906.
3 SHEETS—SHEET 1.
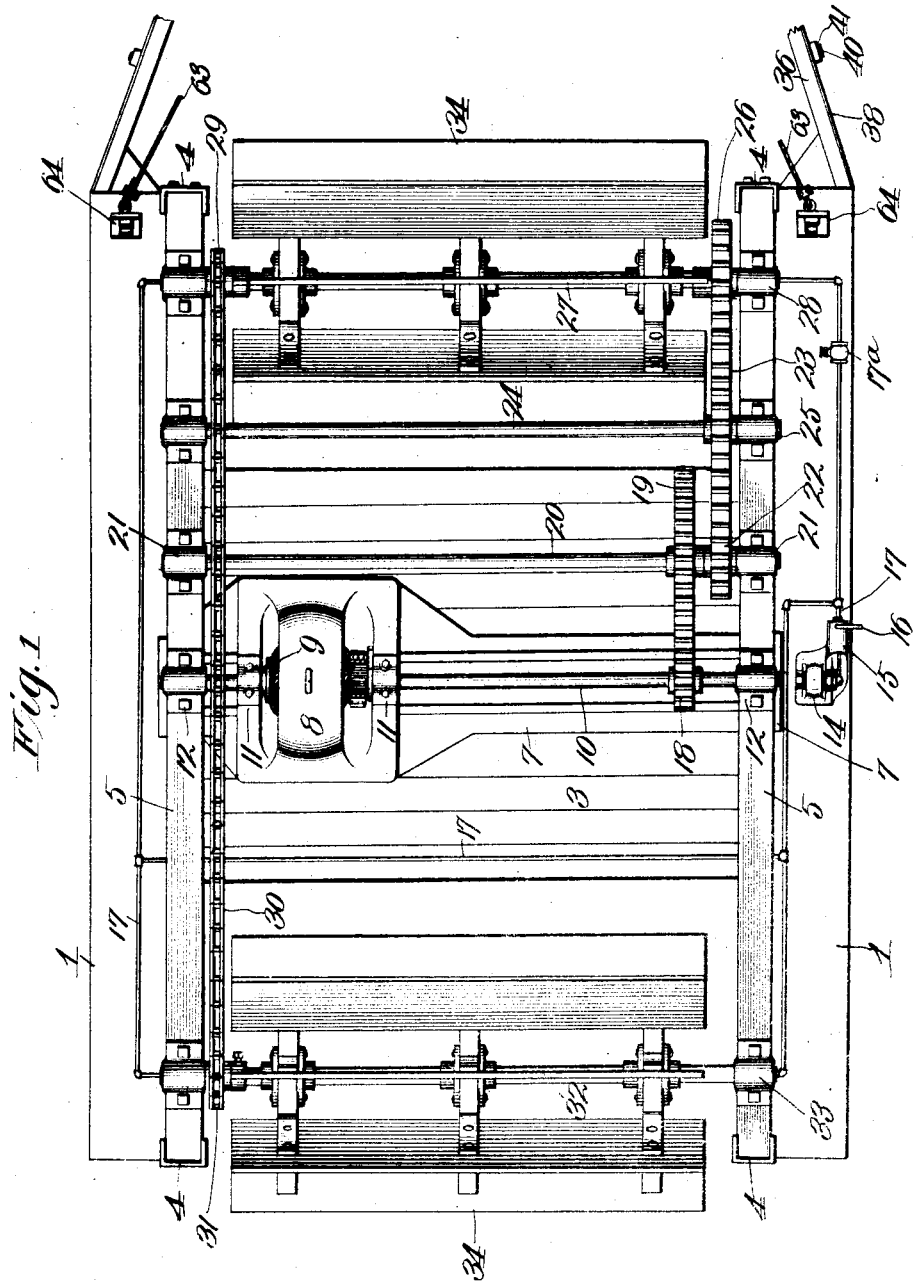
Witnesses
Frank R. Glore
Fred V. Griffith
Inventor
J. W. Dawson.
By George H. Thorpe Atty.

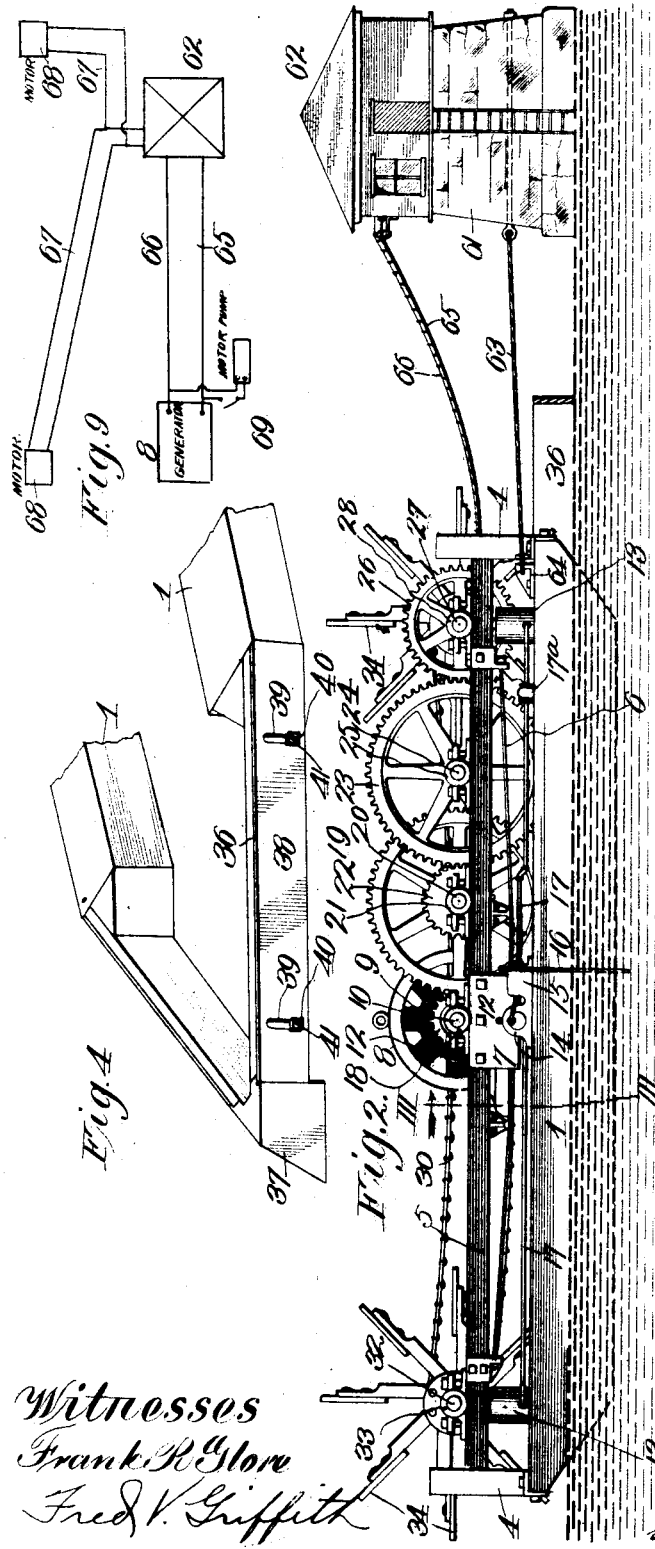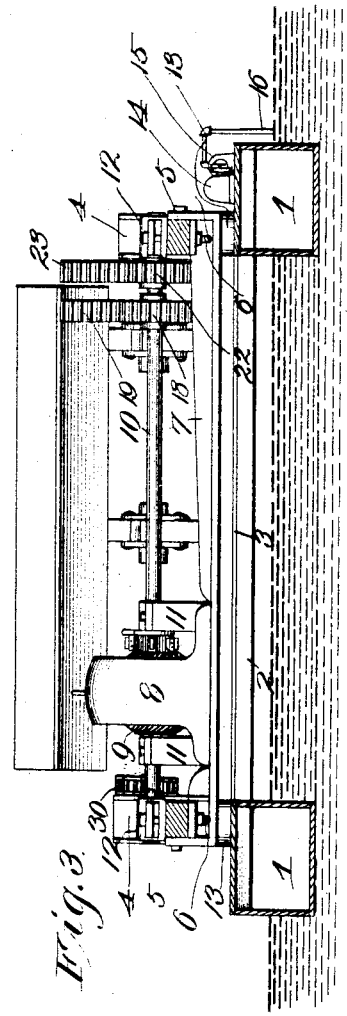

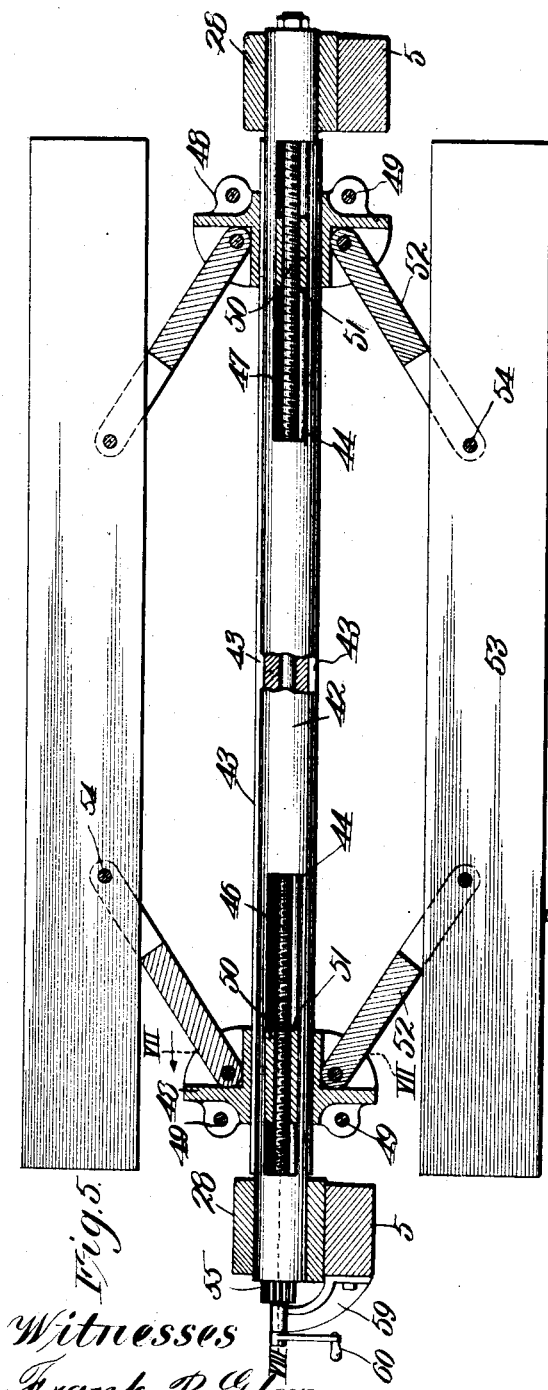
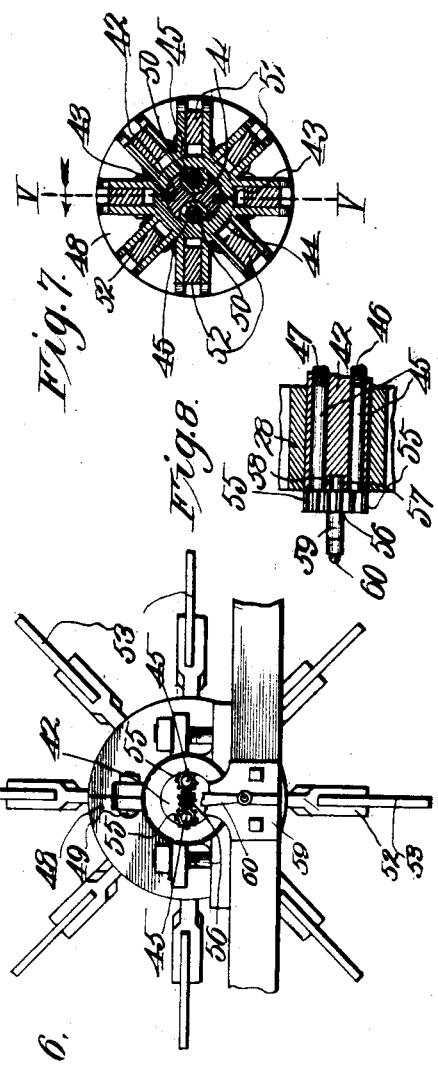

UNITED STATES PATENT OFFICE.

JAMES W. DAWSON, OF SAN FRANCISCO, CALIFORNIA, ASSIGNOR OF ONE-FOURTH TO ROBERT W. GEES, OF KANSAS CITY, MISSOURI.

FLOATING POWER PLANT.

No. 867,192.  Specification of Letters Patent.  Patented Sept. 24, 1907.

Application filed September 13, 1906. Serial No. 334,437.

*To all whom it may concern:*

Be it known that I, JAMES W. DAWSON, a citizen of the United States, residing at San Francisco, in the county of San Francisco and State of California, have invented certain new and useful Improvements in Floating Power Plants, of which the following is a specification.

This invention relates to floating power plants, and more especially to apparatus whereby the current of a stream of water is utilized for generating electricity to be distributed to distant points for operating motors in ice plants and for other purposes, and my object is to produce apparatus of this character which will operate efficiently and reliably.

A further object is to produce apparatus which can be adjusted to operate a dynamo at a practically uniform speed irrespective of variations of speed in the current.

Other objects of the invention will hereinafter appear, and in order that it may be fully understood reference is to be had to the accompanying drawings, in which,—

Figure 1, is a top plan view of apparatus embodying my invention. Fig. 2, is a side view of the same and of a tower which forms an anchor for the floating plant and a point from which the current of electricity is distributed. Fig. 3, is a vertical cross section taken on the line III—III of Fig. 2. Fig. 4, is a detail perspective of a portion of the frame-work of the plant, equipped at its front or up-stream end with a log deflector. Fig. 5, is a section taken on the line V—V of Fig. 7, showing a paddle-wheel of expansive and contractive construction. Fig. 6, is an end view of the same. Fig. 7, is a cross section on the line VII—VII of Fig. 5. Fig. 8, is a section on the dotted line VIII of Fig. 5. Fig 9, is a diagrammatic view showing the electrical circuits.

In the said drawing the frame-work of the floating plant is in the form of a catamaran, by preference, that is, consists of a pair of parallel floats or boats 1, connected by suitable cross-bars 2 (one only appears), and a flooring 3, the flooring terminating short of the ends of the floats or boats as shown in Fig 1, so as to leave openings or bifurcations between the opposite ends of said floats or boats for a purpose which hereinafter appears.

4 indicates vertical channeled standards erected at the opposite ends and inner corners of the floats or boats, and fitting slidingly in said channel or guide standards are longitudinal timbers 5 reinforced by truss-frames 6 to prevent said timbers sagging at the middle.

7 indicates a cross-plate connecting timbers 5 about midway their length and 8 is a dynamo mounted on said cross-plate, the armature 9 of the dynamo being mounted on a cross-shaft 10 journaled in bearings 11 of the dynamo and in boxes 12 secured to the timbers 5. The vertically adjustable frame constituted by the trussed-timbers 5 and the connecting cross-plate 7 is mounted upon the upper ends of the plunger stem of a series of hydraulic jacks 13 mounted on the floats or boats and of common and well-known construction.

14 indicates a small motor connected to a small pump 15 mounted on one of the floats or boats and provided with a suction-pipe 16 depending into the water. The pump is provided with a system of water-distributing pipes 17 for the purpose of supplying water to the hydraulic jacks at certain times and a discharge 17ª.

18 indicates a gear-pinion on shaft 10 and meshing with a large gear-wheel 19 on a cross-shaft 20 journaled in bearings 21 on the timbers 5 of the vertically adjustable frame. 22 is a gear-pinion on shaft 20 and meshing with a large gear 23 on a second cross-shaft 24 journaled in bearings 25 on said frame, and said gear 23 meshes with a smaller gear 26 on cross-shaft 27 journaled in bearings 28 on said vertically adjustable frame, shaft 27 being equipped with sprocket-wheel 29 connected by a chain 30 with a similar sprocket 31 on a cross-shaft 32 at the opposite end of the catamaran and journaled in bearings 33 on the vertically adjustable frame, and rigidly secured on shafts 27 and 32 are similar paddle-wheels 34 of such diameter as to depend into the water at opposite ends of the platform connecting the floats or boats, the sprocket gearing between said wheels insuring a coöperative action between them for the purpose of driving the armature of the dynamo at high speed and thus generating an electric current to be distributed as hereinafter explained. A V-shaped deflecting frame 36 projects forward from that end of the boat which will be disposed up-stream and is equipped by preference with a metallic prow or shoe 37, this frame being designed to protect the contiguous paddle-wheel from injury by logs and brushwood which may be in the stream, and in order to guard against the possibility of a log diving under the deflector at times when the current is exceedingly swift, the deflecting frame is provided with a pair of plates 38 having vertical slots 39 engaging bolts 40 carried by the frame, clamping nuts 41 engaging the bolts to clamp plates 38 at the desired points of vertical adjustment, and thus in effect vary the depth of the deflecting frame in the water. If desired both ends of the catamaran can be equipped with deflecting frames.

The paddle-wheels shown in Figs. 1, 2 and 3 are adapted to be submerged in the water more or less through the adjustment of the vertically adjustable frame hereinbefore described. If desired the wheels may be of the construction shown in Figs. 5, 6 and 7, in which case the use of a vertically adjustable frame will be unnecessary because the diameter of the wheel itself can be varied. In the modified construction of wheel referred to, 42 indicates the shaft provided with longitudinal keys or splines 43 and at opposite sides with grooves 44. 45 indicates parallel shafts extending longitudinally through grooves 44 and journaled in the body of shaft 42; said shafts 45 being provided within grooves 44 with screw-threaded portions 46 and 47, the portions 46 of each shaft being threaded in the opposite direction to portion 47, it being further noticed that the portion 46 of one shaft and 47 of the other are contiguous, (see Fig. 8) for a purpose which hereinafter appears. 48 indicates a pair of collars mounted to slide but not rotate on shaft 42 and each composed of halves bolted together as at 49. Each half is equipped with a semi-cylindrical rib 50 projecting into the continuous groove 44 and provided with threaded passages 51 engaging the threaded portion 46 or 47, as the case may be, occupying said groove. Pivoted to the collars are arms 52 pivotally carrying paddles or blades 53 at their outer ends as at 54, the arms of the collars projecting inwardly with respect to the ends of the paddles or blades at all times except when the wheel is expanded to its greatest diameter, at which time arms 52 stand at right angles to the shafts. To effect a change in the size of the wheel the shafts 45 are provided at one end with cog wheels 55 meshing with a cog wheel 56 secured on a short shaft 57 journaled in a socket 58 in shaft 42 and in bearing 59 secured to the contiguous timber 5, a crank-handle 60 being utilized to turn shaft 57 for the purpose of revolving shafts 45 in opposite directions and thus causing the collars 48 to approach or move apart.

The floating plant may be anchored in the stream in any suitable manner, one method of anchoring being exemplified in Fig. 4 where will be seen a pier 61 surmounted by a station 62, one or more cables 63 being connected to the pier and to brackets 64 attached to the floats or boats 1. The dynamo or generator is connected by conductors 65 and 66 to the station adapted to contain a transformer (not shown) or equivalent device for distributing current through one or more circuits 67 to operate motors 68 in said circuits, and through such operation drive the machinery for manufacturing ice or for other purposes.

The pump motor hereinbefore described is connected up in circuit with conductors 65 and 66 and is provided with a switch 69 normally open but adapted to be closed temporarily when it is desired to operate said pump motor and cause the same to pump water into the hydraulic jacks for the purpose of raising the vertically adjustable frame.

In practice, with the parts arranged as shown, the impact of the flowing water on the paddles or blades of the wheels rotate the latter as hereinbefore stated and through the gearing described drive the dynamo and generate electricity which is distributed as indicated in Fig. 9 or otherwise, to points more or less remote from the stream. As it is necessary that the rotation of the dynamo shall be substantially uniform, it is essential to provide means for regulating the speed, or preventing sudden fluctuations in its speed, and this object I accomplish by varying the leverage of the water on the wheel. I accomplish this object by raising or lowering the wheels as hereinbefore explained or by varying the diameter of the wheels, or both methods may be combined if desired, and it will be further understood that the armature shaft will in practice, be equipped with one or more fly-wheels, (not shown) to render the speed of revolution as nearly uniform as practical.

A plant of the character described will be found especially serviceable for generating electricity to operate ice machinery in small towns where it would be otherwise impracticable to have a cold storage plant. A large number of small plants of this character would be of incalculable value to the farmers and fruit growers as it would permit them at a minimum cost to avoid a sacrifice of fruit and other products.

From the above description it will be apparent that I have produced apparatus of the character described and which embodies the features of advantage enumerated as desirable in the statement of the object of my invention and which obviously is susceptible of modification in various particulars without departing from the principle of construction involved.

Having thus described the invention what I claim as new and desire to secure by Letters Patent, is:—

1. A floating power plant provided with one or more paddle-wheels to be rotated by the current, a dynamo, means for transmitting motion from the wheel to the dynamo, one or more motors at any desired distance from the dynamo, and means actuated by the electricity generated by the dynamo, to raise the latter and the paddle-wheel or wheels.

2. A floating power plant provided with one or more paddle-wheels to be rotated by the current, a dynamo, means for transmitting motion from the wheel to the dynamo, one or more motors at any desired distance from the dynamo, a motor pump, hydraulic jacks connected to the pump, a suction pipe extending from the pump down into the water, conductors connecting the dynamo and pump in the same circuit, and a switch to break such circuit.

3. In apparatus of the character described, a catamaran, a paddle-wheel carried thereby depending into the water, means for varying the depth of the wheel in the water, a dynamo mounted on the catamaran and driven by said wheel, a pier in the stream provided with a station, conductors leading from the dynamo to said station, a V-shaped deflector projecting forward from the catamaran and protecting the paddle-wheel, and vertically adjustable plates carried by the deflector and adapted to be submerged varying distances in the water.

In testimony whereof I affix my signature, in the presence of two witnesses.

JAMES W. DAWSON.

Witnesses:
I. H. MERRITT,
G. Y. THORPE.